US011122420B2

(12) United States Patent
Kwatra et al.

(10) Patent No.: US 11,122,420 B2
(45) Date of Patent: Sep. 14, 2021

(54) INTELLIGENT TEMPORARY CONTACT SHARING BETWEEN USER EQUIPMENT

(71) Applicant: INTERNATIONAL BUSINESS MACHINES CORPORATION, Armonk, NY (US)

(72) Inventors: Shikhar Kwatra, Morrisville, NC (US); Paul J. Landsberg, Raleigh, NC (US); Christophe R. Tretz, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 39 days.

(21) Appl. No.: 15/971,104

(22) Filed: May 4, 2018

(65) Prior Publication Data
US 2019/0342748 A1 Nov. 7, 2019

(51) Int. Cl.
*H04W 8/20* (2009.01)
*H04W 4/02* (2018.01)
*G06N 20/00* (2019.01)
*H04W 84/18* (2009.01)
*H04W 4/80* (2018.01)
*H04W 4/70* (2018.01)

(52) U.S. Cl.
CPC .......... *H04W 8/205* (2013.01); *G06N 20/00* (2019.01); *H04W 4/025* (2013.01); *H04W 4/70* (2018.02); *H04W 4/80* (2018.02); *H04W 84/18* (2013.01)

(58) Field of Classification Search
CPC ..... H04M 1/274516; H04M 1/274533; H04M 1/7253; H04M 1/72572; H04M 2250/60; H04W 4/02; H04W 4/80; H04W 4/50; G06Q 20/223; G06Q 20/3278; H04B 5/0031; H04L 67/10; H04L 67/1095; H04L 67/1097
See application file for complete search history.

(56) References Cited

U.S. PATENT DOCUMENTS

| | | | |
|---|---|---|---|
| 8,750,851 B2 | 6/2014 | Le Thierry d'Ennequin | |
| 9,313,327 B2* | 4/2016 | Agrawal ................. | H04M 3/44 |
| 2012/0004015 A1* | 1/2012 | Le Thierry D'Ennequin .............. | |
| | | | H04M 1/274516 |
| | | | 455/566 |
| 2012/0157157 A1* | 6/2012 | Chakra ........... | H04M 1/274516 |
| | | | 455/550.1 |
| 2013/0095801 A1* | 4/2013 | Kermoian ........... | G06F 3/04883 |
| | | | 455/414.1 |
| 2015/0358420 A1* | 12/2015 | Mese .................. | G06F 3/04842 |
| | | | 715/748 |

(Continued)

*Primary Examiner* — Yuwen Pan
*Assistant Examiner* — Umair Ahsan
(74) *Attorney, Agent, or Firm* — Griffiths & Seaton PLLC

(57) ABSTRACT

Embodiments for intelligent temporary contact sharing between user equipment (UE) by a processor. A temporary exchange of contact data may be provided between a first UE and a second UE via a wireless communication network according to one or more policies, user preferences, historical data, a defined physical or virtual proximity between the first UE and the second UE, or a combination thereof. The contact data may be automatically deleted between the first UE and the second UE according to the one or more policies, the user preferences, the historical data, the defined physical or virtual proximity between the first UE and the second UE, or a combination thereof.

9 Claims, 6 Drawing Sheets

(56) References Cited

U.S. PATENT DOCUMENTS

| | | | |
|---|---|---|---|
| 2016/0112096 A1* | 4/2016 | Zhao | G06F 3/0488 455/41.1 |
| 2016/0196556 A1* | 7/2016 | Tamboly | G06Q 20/40 705/71 |
| 2016/0335350 A1* | 11/2016 | Bawri | H04M 1/274533 |
| 2017/0038847 A1* | 2/2017 | Schorsch | G06F 3/017 |
| 2017/0099376 A1* | 4/2017 | Agrawal | G06Q 10/10 |
| 2018/0103137 A1* | 4/2018 | Reddy | H04M 1/274516 |

* cited by examiner

INTELLIGENT TEMPORARY CONTACT SHARING BETWEEN USER EQUIPMENT

BACKGROUND OF THE INVENTION

Field of the Invention

The present invention relates in general to computing systems, and more particularly, to various embodiments for providing intelligent temporary contact sharing between user equipment (UE) by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices that rest in the palm of a person's hand allow for the sharing of information between users in an increasingly user friendly and simple manner. The increasing complexity of society, coupled with the evolution of technology continue to engender the sharing of a vast amount of information between consumers, businesspersons, educators, and others.

SUMMARY OF THE INVENTION

Various embodiments for intelligent temporary contact sharing between user equipment (UE) by a processor are provided. In one embodiment, by way of example only, a method for dynamic proximity and pattern history based temporary contact sharing within a cloud computing environment, again by a processor, is provided. A temporary exchange of contact data may be provided between a first UE and a second UE via a wireless communication network according to one or more policies, user preferences, historical data, a defined physical or virtual proximity between the first UE and the second UE, or a combination thereof. The contact data may be automatically deleted between the first UE and the second UE according to the one or more policies, the user preferences, the historical data, the defined physical or virtual proximity between the first UE and the second UE, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
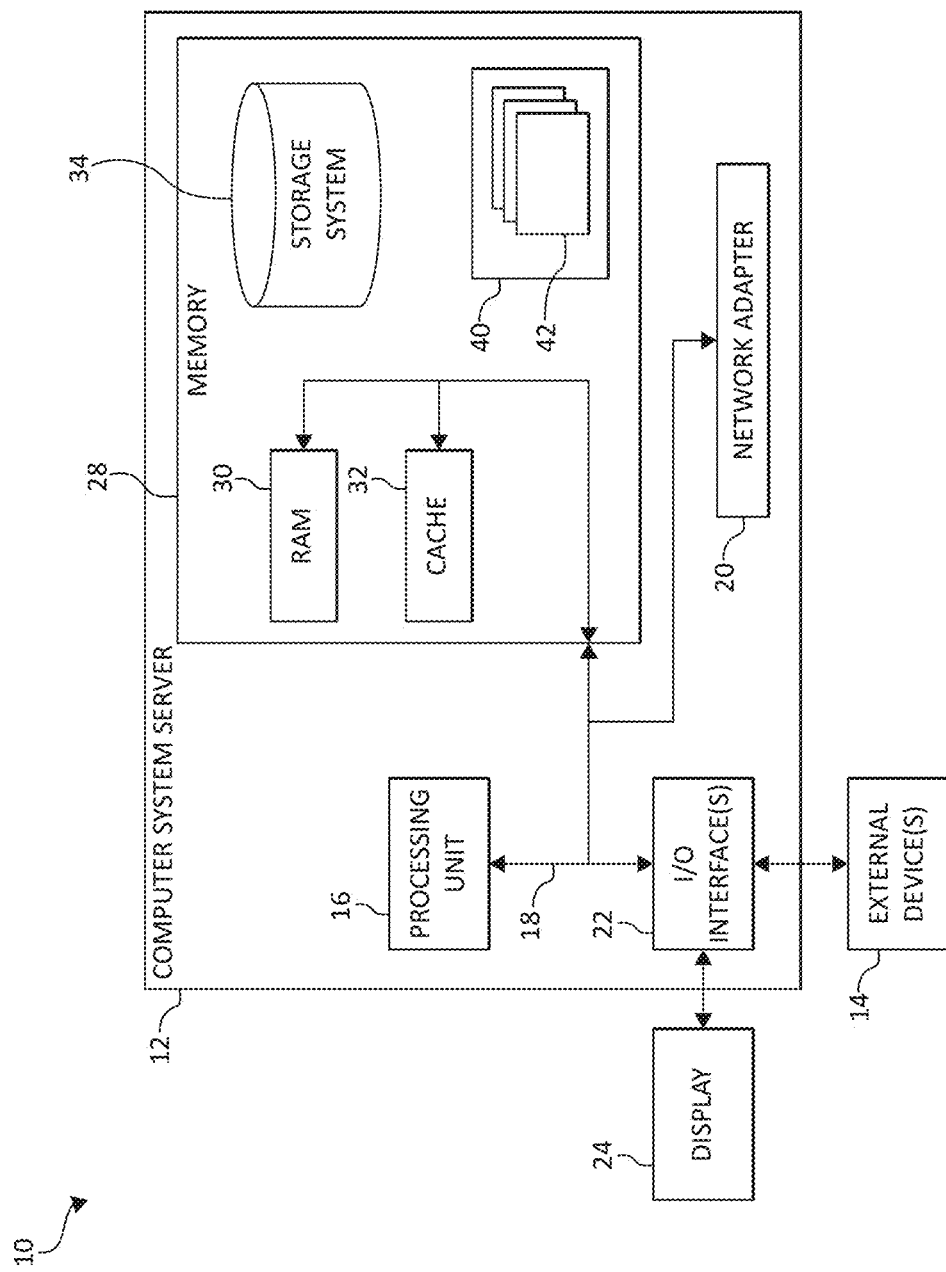
FIG. 1 is a block diagram depicting an exemplary cloud computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

With the increased globalization of various entities (e.g., users, organizations, and/or companies), there is a tendency for collaboration of users (e.g., friends, business associates, etc.) across different entities and geographically-bound jurisdictions. For example, many persons such as, for example, travelers on vacation or businesspersons on a business trip may encounter and meet fellow travelers or business associates/colleagues during a temporary period (e.g., a few days at a vacation spot or business trip location). These persons may forget to take contact information (e.g., business cards). A need exists for the ability to temporarily store contact info only for a select period of time such as, for example, when persons visit a vacation destination or business conference trip and desire to only keep in touch with the fellow vacation travelers or conference attendees for only that amount of time.

Accordingly, the present invention provides for temporarily saving one or more select contacts in a user equipment (UE) associated with a user for a select time without permanently saving the contact information (e.g., telephone number, email address, address, etc.) such that storage space and memory of the UE is not completely consumed with contact information that the user only desires to store for the temporary time period. In one aspect, contact information may be a phone number, address, email address, IP address, and even global positioning satellite ("GPS") coordinates. For example, for GPS coordinates, assume there is a 100% connected and networked computing environment. If a user walks or passes by a "smart screen" of a computing device or console (e.g., kiosk, massive video screen, etc.), the contact information of the user may be connected to another user through that smart screen.

In one aspect, the present invention provides for a cognitive system for intelligent temporary contact sharing between UEs by a processor. In one embodiment, by way of example only, the present invention provides for dynamic proximity and pattern history based temporary contact sharing within a cloud computing environment. A temporary exchange of contact data may be provided between a first UE and a second UE via a wireless communication network according to one or more policies, user preferences, historical data, a defined physical or virtual proximity between the first UE and the second UE, or a combination thereof. The contact data may be automatically deleted between the first UE and the second UE according to the one or more policies, the user preferences, the historical data, the defined physical or virtual proximity between the first UE and the second UE, or a combination thereof.

In an additional aspect, mechanisms of the illustrative embodiment provide for a cognitive system that temporarily shares and/or stores contact information (e.g., phone contacts) between user devices in a network such as, for example, near field communication (NFC) network or Ad-hoc network, and the like. The contact information may be automatically deleted and removed from an IoT device based on a location and/or distance of the IoT device from the network. More specifically, the present invention enables the exchange of contact information between one or more mobile devices using an NFC/Ad-hoc network upon a user device (e.g., IoT device) entering the network group. The stored contact may be automatically deleted and removed from a temporary storage on the one or more mobile devices based on the location and/or distance of the one or more mobile devices from the group of mobile devices in the network. A query may be provided to enable a user of the one or more mobile devices to permanently store, retain, modify, update, and/or delete the contact information and/or a group of contacts in a permanent contact list based on one or more user preferences, policies, and/or rules.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
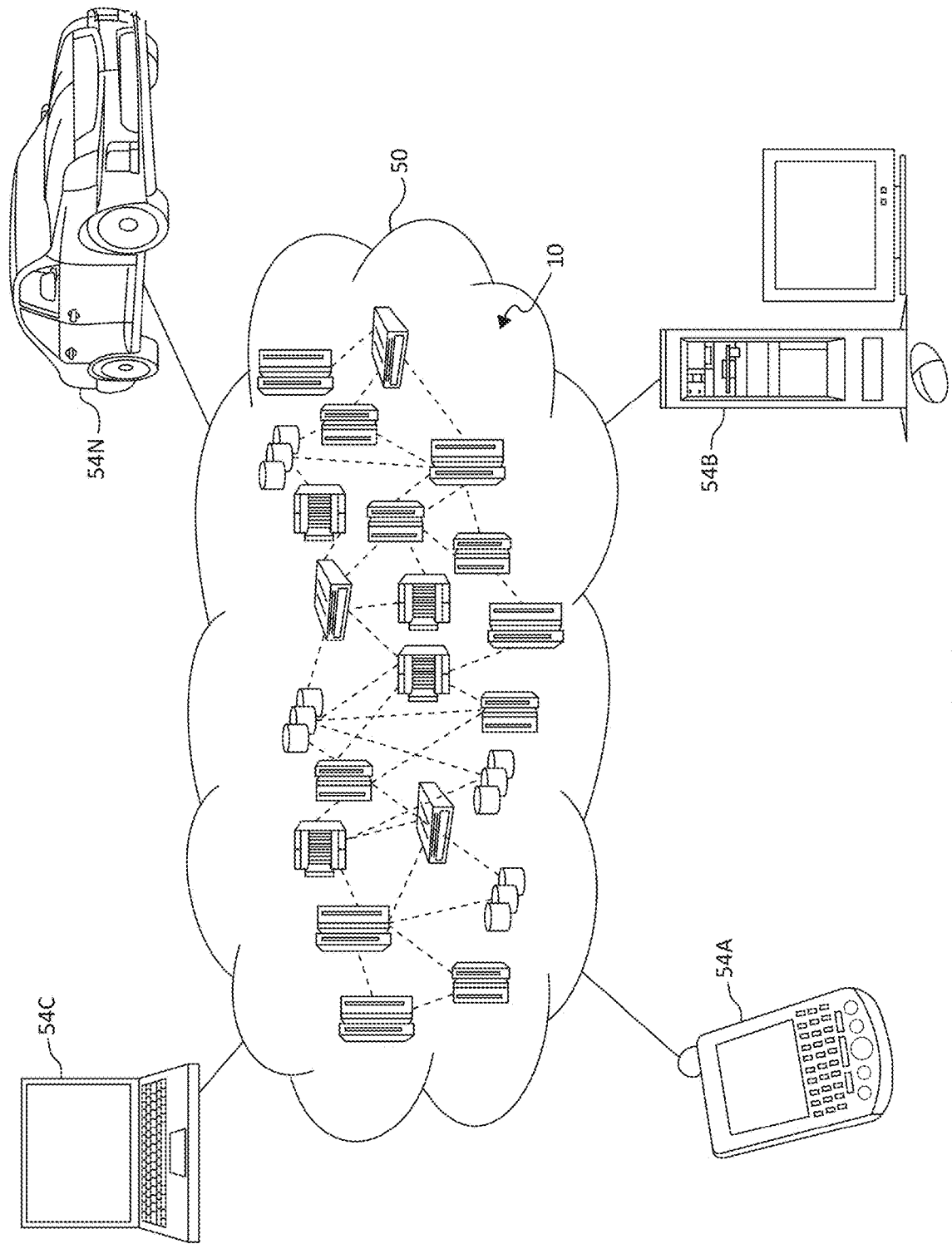
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
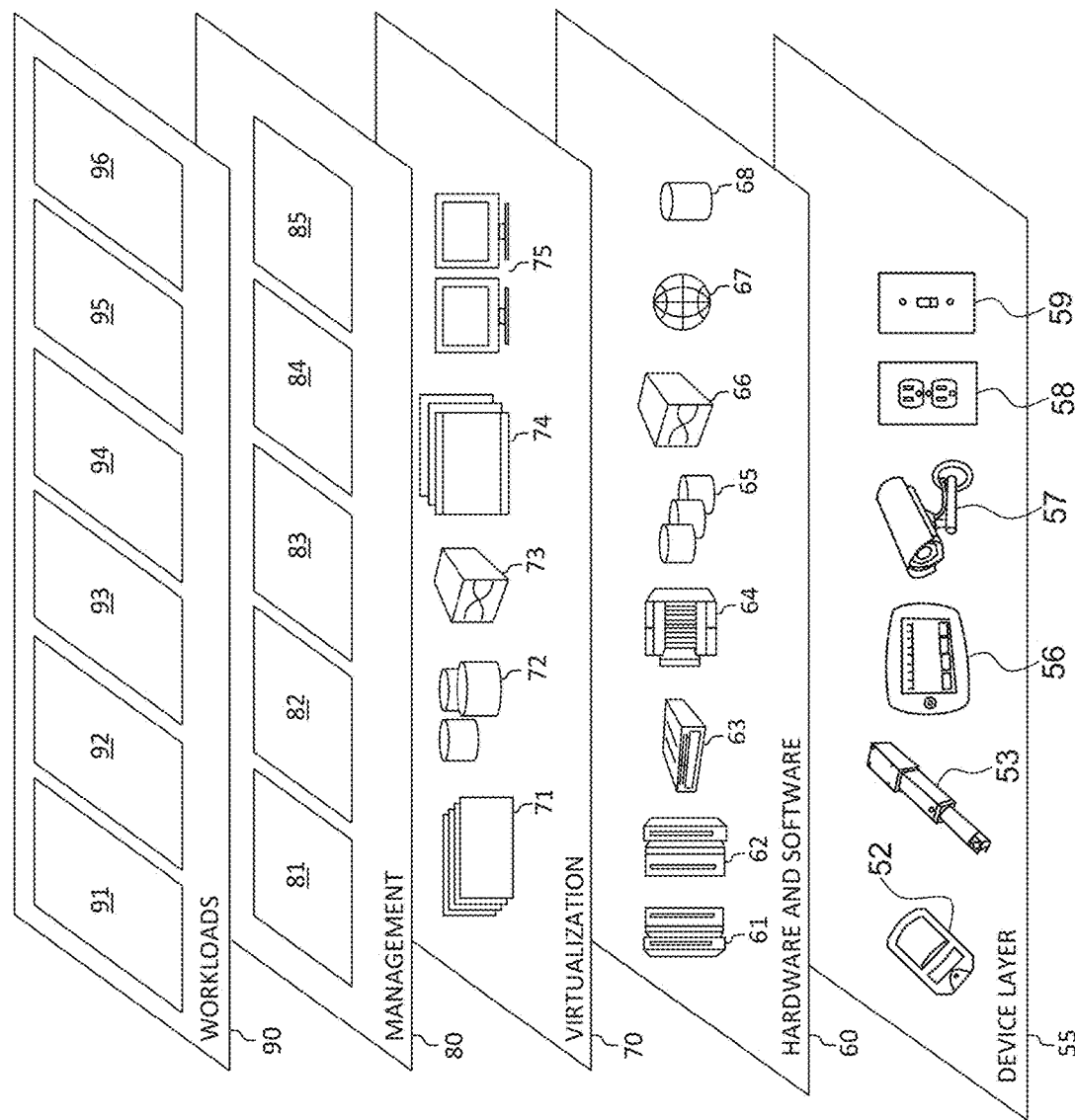
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent temporary contact sharing between UEs. In addition, workloads and functions 96 for intelligent temporary contact sharing between UEs may include such operations as data analytics, data analysis, and as will be further described, notification functionality. One of ordinary skill in the art will appreciate that the workloads and functions 96 for intelligent temporary contact sharing between UEs may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously indicated, a mobile device may be triggered to join a temporary cluster of networked mobile devices in an Internet of Things (IoT) computing environment. The temporary cluster of networked mobile devices may be a sub-network of a larger, general network. That is, the temporary cluster of networked mobile devices may comprise of only those mobile devices enabled to join the temporary cluster of networked mobile devices.

In one aspect, one or more mobile devices may be triggered for performing an information exchange. In one aspect, the triggering of the mobile device for information exchange may be triggered by one or more of the mobile devices tapping on each other of the one or more mobile devices. In an alternative aspect, instead of tapping each of the mobile devices together with NFC and sharing contacts instantly in each other's mobile devices, each of the mobile devices may be linked together to connect each of the mobile devices to create the temporary cluster of linked mobile devices (e.g., an ad-hoc network) in a cloud computing system/database (if the users tend to have one) for temporarily sharing and storing the user contact information. The user can connect to, turn on, and/or join this "ad-hoc network" for the user's mobile device to immediately share contacts or user contact information with those who have also connected to, turned on, and/or joined the ad-hoc network.

The one or more mobile devices (e.g., each of the temporary cluster of networked mobile devices) may be NFC enabled to perform a bidirectional exchange of information. A bidirectional exchange of contact information may be provided (or performed) between the mobile device and one or more of the temporary cluster of networked mobile devices. A temporary list of contacts may be defined and created according to the bidirectional exchange of information. Also, one or more contacts may be added to, deleted from, and/or updated in the temporary list of contacts while the one or more of the mobile devices are associated with the temporary cluster of networked mobile devices according to one or more policies, one or more user preferences, the historical data, a defined physical or virtual proximity between each of the one or more mobile devices, or a combination thereof.

The contact information may be located in one or more of the mobile devices and may be retained while the temporary cluster of networked mobile devices remains within a defined distance from one another. That is, as long as the one or more mobile devices associated with the temporary cluster of networked mobile devices remains in a defined distance or defined location/region (e.g., building, city, community, or defined radius from a selected location) from the temporary cluster of networked mobile devices, the contact information may be retained in one or more of the mobile devices.

A determination operation may be performed to determine if one or more of the mobile devices have traveled or moved to a location outside the defined distance or the defined location/region (e.g., a smartphone leaving a vacation destination or a computing tablet moving outside a defined radius such as, for example, 5 miles). If the mobile device has traveled or moved to a location outside the defined distance or the defined location/region, the contact information may be automatically deleted from the mobile device upon expiration of a predetermined time period. If the mobile device has traveled or moved to a location outside the defined distance or the defined location/region, the bidirectional exchange of contact information may be terminated and any of the temporary contact information may be deleted. In one aspect, each mobile device may be provided a delayed query asking the user to retain the contact/group of contacts and/or make the contact/group of contacts part of the permanent storage.

In one aspect, the temporarily stored contact information may remain in storage of the one or more mobile devices while the temporary cluster of networked mobile devices remains within a selected distance from one another. A timer (e.g., a built-in timer) may be used and set to automatically delete the contact and/or list of contacts from the temporary storage following expiration of the set time. That is, the timer is triggered to start if the one or more mobile devices move to a location outside the selected distance (e.g., moved away from the temporary cluster of networked mobile devices). For example, the timer may be set as having a default time period (e.g., default of 2 days). In an additional aspect, the NFC mobile devices (or a mobile device operating system) can initially trigger the timer to count a selected duration and return back to sleep (e.g., enter a sleep mode) by running in the back-end of a mobile device or system associated with the mobile device. The sleep timer may then trigger the automatic deletion of the phone contacts list after a span of 2 days has been completed. The sleep timer may trigger automatic deletion or permanent saving to a user's device (either laptop, phone or alternate device) after a configurable time period (e.g., 2 days) based on the user's preferences or learnt preferences (e.g., pattern history). The sleep timer may also trigger deletion of a subset of a plurality of users and saving, for example, of others' contact information based on interactions and a friendship/association level as matured or learned over the event duration.

Upon determining the one or more mobile devices has moved to a location outside the selected distance, the timer is triggered and starts counting the selected or default time period. Upon expiration of the selected or default time period, the temporary contact information and/or list of contacts may be deleted. It should also be noted that if a mobile device such as, for example, mobile device "A" moves to the location outside the selected distance, the contact information of mobile device "A" may be deleted, retained, or altered in alternative mobile devices that are associated with the temporary cluster of networked mobile devices. One or more of the alternative mobile devices may be alerted or notified that the mobile device such as, for example, mobile device "A" has moved to a location outside the selected distance. One or more of the alternative mobile devices may cognitively or dynamically delete the contact information of mobile device "A" according to user preferences, policies, parameters, rules, or learned behavior of the user in relation to each individual alternative mobile device. For example, a first alternative mobile device may dynamically delete the contact information of mobile device "A" based on a user preference. Alternatively, a second alternative mobile device may cognitively determine, according to a machine learning operation of learning behavior, patterns, and interactions between the second alternative mobile device and the contact information of mobile device "A", to permanently retain and/or continue to temporarily retain the contact information of mobile device "A."

Figure 4:
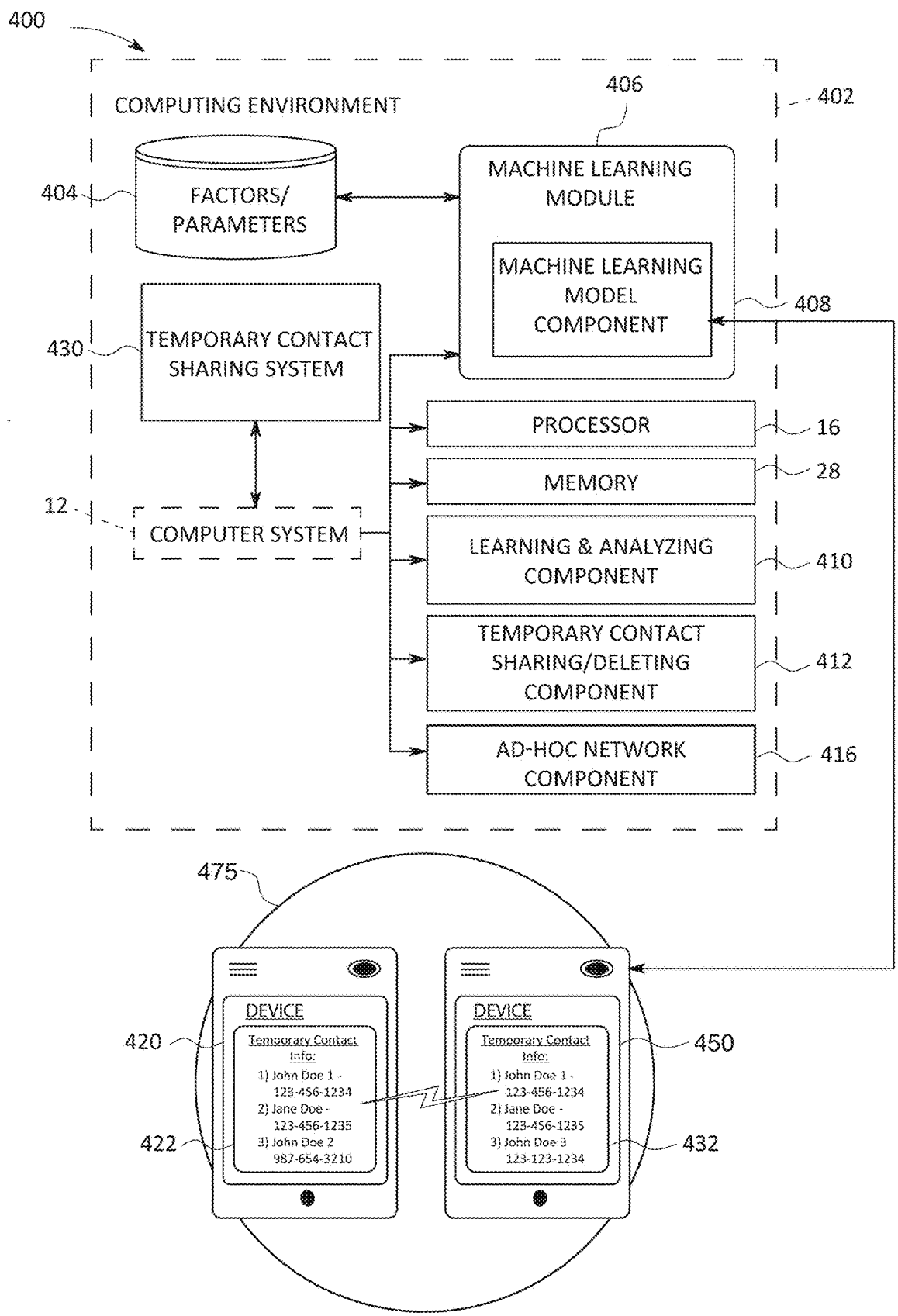
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown. FIG. 4 illustrates intelligent temporary contact sharing workloads and functions and training of a machine learning model in a computing environment, such as a computing environment 402, according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for intelligent temporary contact sharing between UEs in accordance with the present invention. Many of the functional blocks 400 may execute as background processes on various components, either in distributed computing components, or on the user device, or elsewhere. Computer system/server 12 is again shown, incorporating processing unit 16 and memory 28 to perform various computational, data processing and other functionality in accordance with various aspects of the present invention.

The system 400 may include the computing environment 402, temporary contact sharing system 430 and one or more devices such as, for example, devices (UEs) 420, 450 (e.g., an IoT device, desktop computer, laptop computer, tablet, smartphone, and/or another electronic device that may have one or more processors and memory). The devices 420, 450, the temporary contact sharing system 430, and the computing environment 402 may each be associated with and/or in communication with each other, by one or more communication methods, such as a computing network. In one example, the devices 420, 450 and/or the temporary contact sharing system 430 may be controlled by an owner, customer, or technician/administrator associated with the computing environment 402. In another example, the devices 420, 450, and/or the temporary contact sharing system 430 may be completely independent from the owner, customer, or user of the computing environment 402.

In one aspect, the computing environment 402 may provide virtualized computing services (i.e., virtualized computing, virtualized storage, virtualized networking, etc.) to devices 420 and 450. More specifically, the computing environment 402 may provide virtualized computing, virtualized storage, virtualized networking and other virtualized services that are executing on a hardware substrate.

As depicted in FIG. 4, the computing environment 402 may include a machine learning module 406, a factors and parameters 404 that is associated with a machine learning module 406, and the temporary contact sharing system 430. The factors and parameters 404 may also include user preferences, policies, procedures, functionality, historical data, feedback data, an ontology, a knowledge base, data mappings, and/or other data for the temporary contact sharing system 430. More specifically, the factors and parameters 404 may be a combination of user preferences, policies, procedures, parameters, features, functionality, concepts, relationships between the users and UEs, machine learning data, data, profile data, historical data, tested and validated data, or other specified/defined data for the temporary contact sharing system 430.

The computing environment 402 may also include a computer system 12, as depicted in FIG. 1. The computer system 12 may also include a learning and analyzing component 410, a temporary contact sharing/deleting component 412, and/or an ad-hoc network component 416 each associated with the machine learning module 406 for training and learning one or more machine learning models in a temporary contact sharing system 430.

In one aspect, the machine learning module 406 may include a machine learning model component 408 (e.g., reasoning and learning component) for cognitively learning and identifying users, UEs, and/or creating, defining, and/or temporarily sharing or deleting contact information in the temporary contact sharing system 430. The machine learning module 406 may also include and/or use the one or more data models representing data, data flows, semantic concepts, and mappings to each of the data flows. Additionally, the machine learning model component 408 may infer a relationship between each of the devices 420 and 450. The machine learning module 406 may be initiated to learn or define the one or more policies, the user preferences, the historical data, and the defined physical or virtual proximity between devices 420 and/or 450.

The learning and analyzing component 410 may learn one or more policies, user preferences, historical data, a defined physical or virtual proximity between the first UE and the second UE, or a combination thereof for providing a temporary exchange of contact data between a first user equipment (UE) and a second UE via a wireless communication network.

The temporary contact sharing/deleting component 412, using ad-hoc network component 416, may provide or enable a temporary exchange of contact data between devices 420 and 450, via a wireless communication network (or defined region) such as, for example, wireless network 475, according to one or more policies, user preferences, historical data, a defined physical or virtual proximity between the first UE and the second UE, or a combination thereof. The temporary contact sharing/deleting component 412 may automatically delete the contact data between the devices 420 and 450 according to the one or more policies, the user preferences, the historical data, the defined physical or virtual proximity between the devices 420 and 450, or a combination thereof.

The temporary contact sharing/deleting component 412 may trigger the temporary exchange of the contact data between the devices 420 and 450 by tapping the device 420 with device 450 (or vice versa) using, for example, near field communication (NFC). The temporary contact sharing/deleting component 412 may automatically delete the contact data on the device 420, device 450, or a combination thereof upon device 420 or 450 exiting a defined network location. The temporary contact sharing/deleting component 412 may automatically delete the contact data on the device 420, device 450, or a combination thereof according to an expiration of a predetermined time period.

The temporary contact sharing/deleting component 412 may dynamically revoke, reinstate, or reauthorize the temporary exchange of the contact data between the first UE and the second UE according to the one or more policies, the user preferences, the historical data, the defined physical or virtual proximity between the first UE and the second UE, or a combination thereof.

The temporary contact sharing/deleting component 412 may enable a user via devices 420 and/or 450 via a graphical user interface ("GUI") 422 and 432 to select to permanently retain the contact data on the device 420, device 450, or a combination thereof according to the one or more policies, the user preferences, the historical data, the defined physical or virtual proximity between the first UE and the second UE, or a combination thereof.

The ad-hoc network component 416 may cognitively and temporarily create a temporary ad-hoc network of multiple devices such as, for example, devices 420 and 450 in a cloud computing environment for providing the temporary exchange of the contact data. For example, device 420 and 450 may temporarily form a network to provide bi-directional exchange of data (e.g., the contact information), which may use the storage of the devices 420 and 450 to temporarily store contact information for a selected period of time according to one or more policies, user preferences, historical data, a defined physical or virtual proximity between device 420 and/or 450, or a combination thereof.

Also, the devices 420 and 450 may include the GUIs 422 and 432 enabled to display on the devices 420 and 450 one or more user interface controls for a user to interact with the GUIs 422 or 432. For example, the GUI 422 may interactively display the shared, temporary contact information. For example, the GUI 422 may indicate or display audibly and/or visually information such as, for example, "Temporary Contact Info: 1) John Doe 1 and the telephone number may be 123-456-1234, 2) Jane Doe—123-456-1235, and/or 3) John Doe 2 987-654-3210."

The machine learning module 406 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
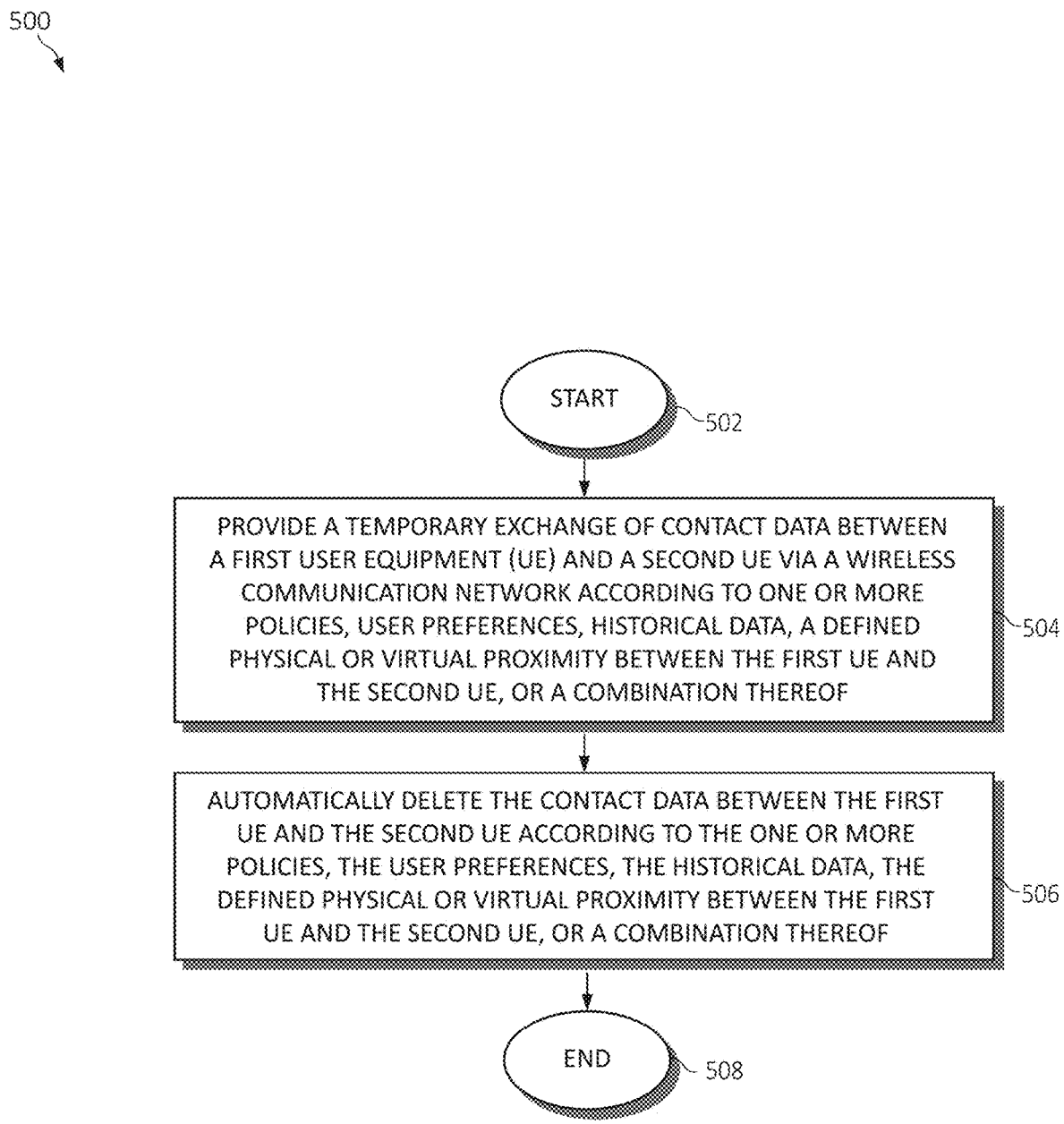
FIG. 5 is a flowchart diagram depicting an exemplary method for intelligent temporary contact sharing between user equipment (UE), again in which various aspects of the present invention may be realized.

Turning now to FIG. 5, a method 500 for intelligent temporary contact sharing between UE by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium.

The functionality 500 may start in block 502. A temporary exchange of contact data may be provided between a first UE and a second UE via a wireless communication network according to one or more policies, user preferences, historical data, a defined physical or virtual proximity between the first UE and the second UE, or a combination thereof, as in block 504. A machine learning component may be initialized to learn or define the one or more policies, the user preferences, the historical data, and the defined physical or virtual proximity between the first UE and the second UE. The contact data may be automatically deleted between the first UE and the second UE according to the one or more policies, the user preferences, the historical data, the defined physical or virtual proximity between the first UE and the second UE, or a combination thereof, as in block 506. The functionality may end, as in block 508.

Figure 6:
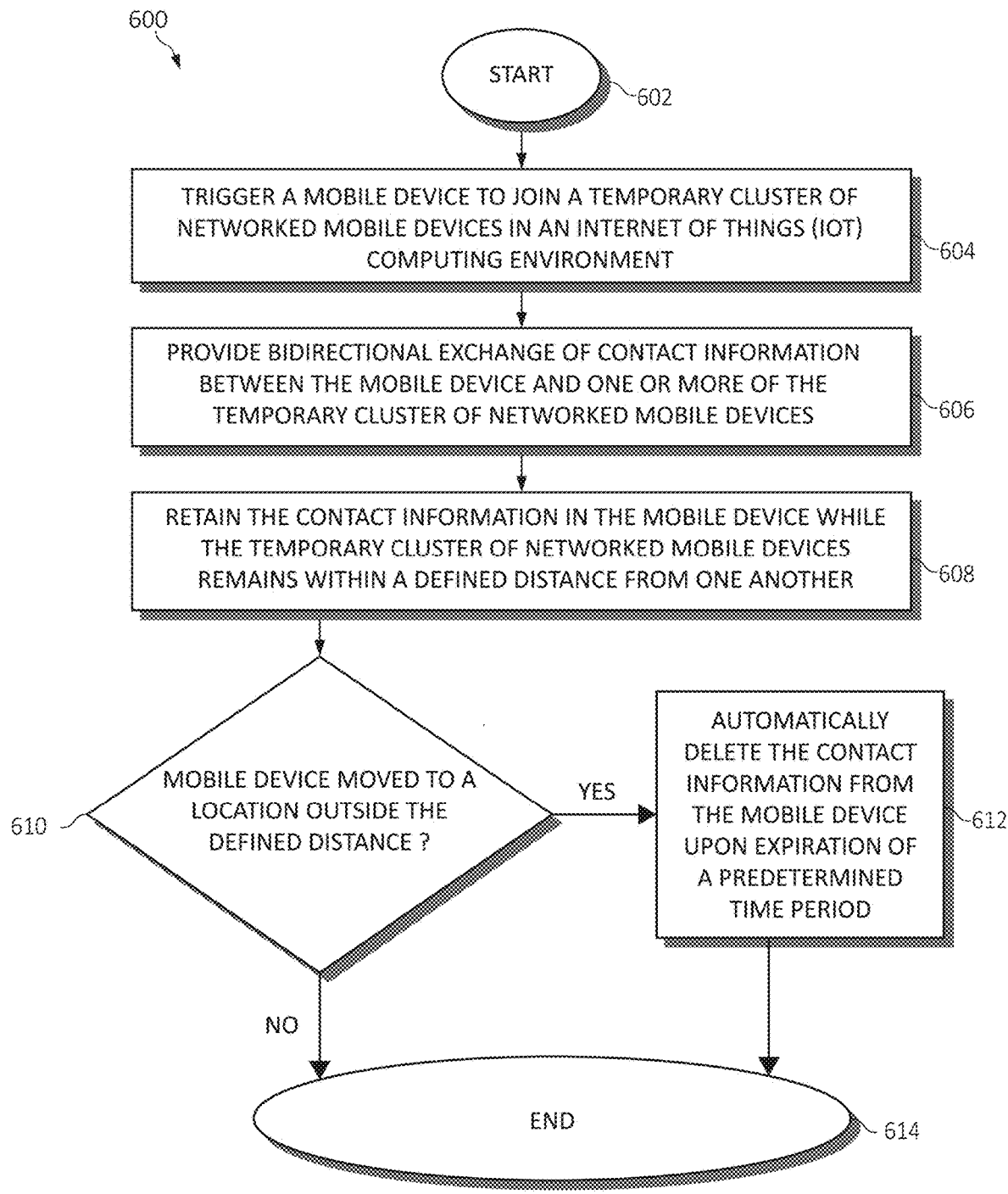
FIG. 6 is a flowchart diagram depicting an additional exemplary method for intelligent temporary contact sharing between user equipment (UE), again in which various aspects of the present invention may be realized.

Turning now to FIG. 6, an additional method 600 for intelligent temporary contact sharing between user equipment (UE) by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium.

The functionality 600 may start in block 602. A mobile device may be triggered to join a temporary cluster of networked mobile devices in an Internet of Things (IoT) computing environment, as in block 604. In one aspect, the triggering of the mobile device for information exchange may be triggered by the mobile device tapping on one or more mobile devices in the temporary cluster of networked mobile devices. The mobile device and each of the temporary cluster of networked mobile devices may be NFC enabled to enable bidirectional exchange of information. A bidirectional exchange of contact information may be provided (or performed) between the mobile device and one or more of the temporary cluster of networked mobile devices, as in block 606. The contact information in the mobile device may be retained while the temporary cluster of networked mobile devices remains within a defined distance from one another, as is in block 608. That is, as long as the mobile device remains in a defined distance or defined location/region (e.g., building, city, community, or defined radius from a selected location) from the temporary cluster of networked mobile devices, the contact information may be retained in the mobile device. A determination operation may be performed to determine if the mobile device has traveled or moved to a location outside the defined distance, as in block 610. If the mobile device has traveled or moved to a location outside the defined distance, the contact information may be automatically deleted from the mobile device upon expiration of a predetermined time period, as in block 612. If the mobile device has not traveled or moved to a location outside the defined distance, the functionality 600 may move to block 614. The functionality may end, as in block 614.

In one aspect, in conjunction with and/or as part of at least one block of FIGS. 5-6, the operations of 500 and/or 600 may include each of the following. The operations of 500 and/or 600 may trigger the temporary exchange of the contact data between a first UE (e.g., mobile device) and the second UE by tapping the first UE with the second UE using near field communication (NFC). A temporary ad-hoc network of a plurality of UEs may be created for one or more users in a cloud computing environment for providing the temporary exchange of the contact data. The operations of 500 and/or 600 may automatically delete the contact data on the first UE, the second UE, or a combination thereof upon the first UE or the second UE exiting a defined network location, and/or automatically delete the contact data on the first UE, the second UE, or a combination thereof according to an expiration of a predetermined time period. A machine learning component may be initialized to learn or define the one or more policies, the user preferences, the historical data, and the defined physical or virtual proximity between the first UE and the second UE.

The operations of 500 and/or 600 may dynamically revoke, reinstate, or reauthorize the temporary exchange of the contact data between the first UE and the second UE according to the one or more policies, the user preferences, the historical data, the defined physical or virtual proximity between the first UE and the second UE, or a combination thereof. Additionally, the operations of 500 and/or 600 may enable a user to select, on one or more UEs, to permanently retain the contact data on the first UE, the second UE, or a combination thereof according to the one or more policies, the user preferences, the historical data, the defined physical or virtual proximity between the first UE and the second UE, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent temporary contact sharing between user equipment (UE) by a processor, comprising:
    creating a temporary ad-hoc network of a plurality of users in a cloud computing environment, the temporary ad-hoc network having a defined network location circumscribing the plurality of users;
    providing a temporary exchange of contact data between a first user equipment (UE) associated with a first one of the plurality of users and a second UE associated with a second one of the plurality of users via a wireless communication network according to one or more policies, user preferences, historical data, and a defined physical or virtual proximity between the first UE and the second UE within the defined network location; wherein the first UE and the second UE are each mobile devices;
    responsive to exchanging the contact data and while the first UE and the second UE are within the defined network location, initializing a machine learning operation to monitor communication interactions between the first UE and the second UE; wherein the machine learning operation deduces an association level and a maturity of the association level over time of those of the plurality of users operating the first UE and the second UE according to the monitored communication interactions;
    upon determining that either of the first UE and the second UE has exited the defined network location by moving farther than a predetermined physical distance from one another outside the defined network location of the ad-hoc network, starting a timer on the first UE or the second UE that exited; and
    upon an expiration of a predetermined time period on the timer, automatically permanently retaining or automatically deleting the contact data between the first UE and the second UE according to the one or more policies, user preferences, historical data, and the deduced association level and the maturity of the association level determined by the machine learning operation between those of the plurality of users operating the first UE and the second UE while in the defined network location; wherein
    upon moving farther than the predetermined physical distance from one another, a notification is provided to each of the first UE and the second UE indicating which one of the first UE or the second UE has moved to a location outside the defined network location.

2. The method of claim 1, further including triggering the temporary exchange of the contact data between the first UE and the second UE by tapping the first UE with the second UE using near field communication (NFC).

3. The method of claim 1, further including dynamically revoking, reinstating, or reauthorizing the temporary exchange of the contact data between the first UE and the second UE according to the one or more policies, the user preferences, the historical data, the defined physical or virtual proximity between the first UE and the second UE, or a combination thereof.

4. A system for intelligent temporary contact sharing between user equipment (UE), comprising:
    one or more computers with executable instructions that when executed cause the system to:
        create a temporary ad-hoc network of a plurality of users in a cloud computing environment, the temporary ad-hoc network having a defined network location circumscribing the plurality of users;
        provide a temporary exchange of contact data between a first user equipment (UE) associated with a first one of the plurality of users and a second UE associated with a second one of the plurality of users via a wireless communication network according to one or more policies, user preferences, historical data, and a defined physical or virtual proximity between the first UE and the second UE within the defined network location; wherein the first UE and the second UE are each mobile devices;
        responsive to exchanging the contact data and while the first UE and the second UE are within the defined network location, initialize a machine learning operation to monitor communication interactions between the first UE and the second UE; wherein the machine learning operation deduces an association level and a maturity of the association level over time of those of the plurality of users operating the first UE and the second UE according to the monitored communication interactions;

upon determining that either of the first UE and the second UE has exited the defined network location by moving farther than a predetermined physical distance from one another outside the defined network location of the ad-hoc network, starts a timer on the first UE or the second UE that exited; and upon an expiration of a predetermined time period on the timer, automatically permanently retains or automatically deletes the contact data between the first UE and the second UE according to the one or more policies, user preferences, historical data, and the deduced association level and the maturity of the association level determined by the machine learning operation between those of the plurality of users operating the first UE and the second UE while in the defined network location; wherein upon moving farther than the predetermined physical distance from one another, a notification is provided to each of the first UE and the second UE indicating which one of the first UE or the second UE has moved to a location outside the defined network location.

5. The system of claim 4, wherein the executable instructions further trigger the temporary exchange of the contact data between the first UE and the second UE by tapping the first UE with the second UE using near field communication (NFC).

6. The system of claim 4, wherein the executable instructions further dynamically revoke, reinstate, or reauthorize the temporary exchange of the contact data between the first UE and the second UE according to the one or more policies, the user preferences, the historical data, the defined physical or virtual proximity between the first UE and the second UE, or a combination thereof.

7. A computer program product for intelligent temporary contact sharing between user equipment (UE) by a processor, the computer program product comprising a non-transitory computer-readable storage medium having computer-readable program code portions stored therein, the computer-readable program code portions comprising:

an executable portion that creates a temporary ad-hoc network of a plurality of users in a cloud computing environment, the temporary ad-hoc network having a defined network location circumscribing the plurality of users;

an executable portion that provides a temporary exchange of contact data between a first user equipment (UE) associated with a first one of the plurality of users and a second UE associated with a second one of the plurality of users via a wireless communication network according to one or more policies, user preferences, historical data, and a defined physical or virtual proximity between the first UE and the second UE within the defined network location; wherein the first UE and the second UE are each mobile devices;

an executable portion that, responsive to exchanging the contact data and while the first UE and the second UE are within the defined network location, initializes a machine learning operation to monitor communication interactions between the first UE and the second UE; wherein the machine learning operation deduces an association level and a maturity of the association level over time of those of the plurality of users operating the first UE and the second UE according to the monitored communication interactions;

an executable portion that, upon determining that either of the first UE and the second UE has exited the defined network location by moving farther than a predetermined physical distance from one another outside the defined network location of the ad-hoc network, starts a timer on the first UE or the second UE that exited; and an executable portion that, upon an expiration of a predetermined time period on the timer, automatically permanently retains or automatically deletes the contact data between the first UE and the second UE according to the one or more policies, user preferences, historical data, and the deduced association level and the maturity of the association level determined by the machine learning operation between those of the plurality of users operating the first UE and the second UE while in the defined network location; wherein upon moving farther than the predetermined physical distance from one another, a notification is provided to each of the first UE and the second UE indicating which one of the first UE or the second UE has moved to a location outside the defined network location.

8. The computer program product of claim 7, further including an executable portion that triggers the temporary exchange of the contact data between the first UE and the second UE by tapping the first UE with the second UE using near field communication (NFC).

9. The computer program product of claim 7, further including an executable portion that dynamically revokes, reinstates, or reauthorizes the temporary exchange of the contact data between the first UE and the second UE according to the one or more policies, the user preferences, the historical data, the defined physical or virtual proximity between the first UE and the second UE, or a combination thereof.

* * * * *